United States Patent Office 2,791,564
Patented May 7, 1957

2,791,564
SURFACE ACTIVE AGENT CONTAINING 4-METHYL-7-DIETHYLAMINOCOUMARIN

Fritz Fleck, Basel, Switzerland, assignor, by mesne assignments, to Saul & Co., Newark, N. J., as nominee of Fidelity Union Trust Company No Drawing. Application July 7, 1953,
Serial No. 366,609

Claims priority, application Switzerland July 11, 1952

6 Claims. (Cl. 252—301.2)

It is known that aminocoumarins of the formula

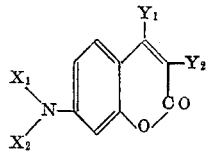

wherein $X_1$, $X_2$, $Y_1$ and $Y_2$ represent hydrogen or alkyl, can be used for brightening protein fibers, synthetic polyamide fibers, acetate silk, etc. However, these compounds are per se difficultly soluble and it has therefore been proposed to make them more suitable for use in aqueous solutions by the introduction thereinto of water-solubilizing groups. However, the introduction of water-solubilizing groups results in a strong decrease in brightening action. It has also been proposed to use the products of the foregoing formula in combination with washing agents, a sufficient quantity of aminocoumarin derivative being added to the washing agent to produce the desired brightening effect on fibers washed with the combination. This quantity varies between about 0.1 and 3%, relative to the washing agent. Where the washing agent was a soap, the aminocoumarin derivative was added to the molten soap. In the case of a synthetic washing agent, the aminocoumarin derivative was admixed therewith in finely pulverized form. However, the preparation of such combinations is, in practice, bound up with difficulties, particularly in the manufacture of mixtures with powdered washing agents. In order to obtain a sufficiently homogeneous admixture of the washing agent powder with the brightener and in order to obtain products of complete solubility in water, such products have to be very finely ground, and this cannot be realized in simple manner.

The present invention relates to a surface active agent, which contains a surface active substance as one component and 4-methyl-7-diethylaminocoumarin in dissolved form and in an amount of at least 5% by weight, as another component. Such agents, hereinafter referred to as concentrates, can contain essentially more, for example 5 times more, 4-methyl-7-diethylaminocoumarin than e. g. 4 - methyl - 7 - dimethylaminocoumarin, the latter being—apart from the first-mentioned derivative—the most active of the components of the above formula for the brightening here involved. The agents according to the present invention can be easily mixed with powdered washing raw materials and yield with the latter homogeneous mixtures which are readily and completely soluble in water. Complete solubility is of great importance because the presence of undissolved constituents on the one hand reduces the brightening action and on the other hand may give rise to small speck-like luminescent spots on the washed material. Consequently, the concentrates are particularly useful for manufacturers of washing agents, who do not themselves produce the raw materials but buy the latter from others and admix them with the brightener.

The use of the concentrates according to the present invention is not restricted to use as additaments for washing agents, and because of the ready water-solubility of the concentrates, they may also advantageously be used per se; thus, the concentrates may be used advantageously in textile operations which do not involve a washing action and which are carried out in neutral or weakly alkaline baths. The concentrates may be liquid, pastes or solid, anhydrous or water-containing, depending upon whether they contain liquid, paste-like or solid, anhydrous or water-containing surface active substances. The latter may belong to widely different chemical groups, i. e. they may be anion-active, non-ionogenic or cation-active. The content of 4-methyl-7-diethylaminocoumarin in the concentrates may vary within fairly wide limits. In most cases, it should amount to 5–20% by weight of the surface active substance. The concentrates are advantageously prepared by stirring the 4-methyl-7-diethylaminocoumarin into the surface active substance at a temperature of 60° C.; where they contain a solvent, such as water, the latter may be eliminated therefrom, if desired, in per se conventional manner, for example by atomization drying. Because of the low melting point of the 4-methyl-7-diethylaminocoumarin (70–72° C.), the aforesaid stirring can be carried out in very simple manner.

The 4-methyl-7-diethylaminocoumarin can also be used in the form of a salt for the preparation of the concentrates, or may be converted into a salt when the surface active substance in which it is dissolved is acid or contains acids.

The following examples set forth representative embodiments of the invention, but are not intended to be limitative thereof. In these examples the parts and percentages are by weight; temperatures are in degrees centigrade.

Example 1

One part of crystalline 4-methyl-7-diethylaminocoumarin is introduced into 16–22.7 parts of a 25% aqueous solution of Marseilles soap at 60° while stirring mildly. In the course of several minutes, a clear light-brown solution results. The water is removed from this solution by atomization. A yellowish soap powder is obtained which contains 15–20% of its weight of 4-methyl-7-diethylaminocoumarin in dissolved form. The soap solution can also be evaporated to dryness under reduced pressure, or the soap can be salted out by the addition of 16–23 parts of saturated sodium chloride solution, followed by isolation and drying of the precipitate.

The obtained product is ground in a ball mill with the forty-fold quantity of thoroughly dried Marseilles soap. A soap powder is obtained which contains 0.37–0.5% of 4-methyl-7-diethylaminocoumarin, and which dissolves to a clear solution even in cold water. The prepartion, containing 15–20% of 4-methyl-7-diethylaminocoumarin, can also be added to a soap melt or soap solution before the preparation thereof, as such or in the form of 20–25% aqueous solution.

A synthetic washing agent can also be added thereto.

4-methyl-7-dimethylaminocoumarin, in contrast to the 4-methyl-7-diethylaminocoumarin, dissolves in a 25% soap solution only after stirring for hours, and the best preparations prepared with this brightener contain at most about 5% thereof in dissolved form.

Example 2

10 parts of 4-methyl-7-diethylaminocoumarin are manually stirred into a solution of 90 parts of Marseilles soap in 270 parts of water at 60°. There is immediately formed a clear light-brown solution from which the water is removed after the manner described in Example 1. A soap powder is obtained which contains 10% of 4-methyl-7-diethyl-aminocoumarin and which dissolves clearly and completely in softened water at 50° up to concentrations of 250 grams per liter. Such a solution remains clear upon dilution with cold, softened water to concentrations at which the material is used. The diluted solutions are greenish and have a blue fluorescence.

The preparation can be used for the optical bleaching of textiles or may be admixed with washing agents, whereby products are obtained which are completely soluble.

Example 3

7.5 parts of 4-methyl-7-diethylaminocoumarin are stirred at 60° into a solution of 25 parts of oleyl sulfate and 15 parts of anhydrous sodium sulfate in 80 parts of water. A slightly frothy paste is obtained which is dried by atomization. There is obtained a weakly yellowish powder which contains 15% of 4-methyl-7-diethylaminocoumarin.

1 part of this powder is mixed in a drum with 14 parts of the anhydrous sodium salt of the acid sulfuric acid ester of glycerine monolaurate. The thus-prepared washing agent contains 1% of 4-methyl-7-diethylaminocoumarin. It dissolves without residue in lukewarm water. In contradistinction to this, a preparation made by grinding 1 part of 4-methyl-7-dimethylaminocoumarin with 99 parts of the sodium salt of the acid sulfuric acid ester of glycerine monolaurate, is not soluble without residue.

4-methyl-7-dimethylaminocoumarin dissolves in the aforementioned oleyl sulfate paste only after stirring for hours and then at most in an amount of 4–5% of the solid substance.

The oleyl sulfate can, with similar success be replaced (while otherwise proceeding according to the first paragraph of this example) by the equivalent quantity of sodium dodecylbenzenesulfonate.

Example 4

3.1 parts of 4-methyl-7-diethylaminocoumarin are dissolved, at 60° and while stirring gently, in 100 parts of a 28% aqueous solution of a technical oleyl sulfate the aminocoumarin dissolves at once. The solution is evaporated to dryness under reduced pressure. There is obtained a practically white, neutral, pulverizable preparation with a content of 10% of 4-methyl-7-diethylaminocoumarin, which preparation gives a clear solution in water at 50° up to 350 grams per liter. Solutions containing more than 1 gram per liter are greenish-yellow and have only a weak fluorescence; more dilute solutions have a blue fluorescence.

In place of the aforementioned washing agent, use may be made of equivalent quantities of sodium dodecylbenzenesulfonate or sodium oleoyl-N-methyltauride or mixtures of these products or sodium cetyl sulfate. Preparations of this type can be used for the same purposes as the product described in Example 2.

Example 5

15 parts of 4-methyl-7-diethylaminocoumarin are stirred into a solution, warmed to 60°, of 85 parts of the sodium salt of a technical naphthalene sulphonic acid-formaldehyde condensation product in 42.5 parts of water. The aminocoumarin dissolves forthwith. The resultant thickly viscous, light-brown paste is evaporated to dryness under reduced pressure. The so-obtained light-yellow product which contains 15% of 4-methyl-7-diethylaminocoumarin, can be pulverized. 1 gram thereof can be dissolved in 1 liter of cold water for the purposes of preparing a stock solution. The product dissolves immediately. Prior to actual use, this stock solution is diluted 15–60 times with water.

Instead of the 4-methyl-7-diethylaminocoumarin, an equivalent quantity of the neutral sulfate of this compound may be used with the same result.

The preparation is suitable for use as an optical bleaching agent, in neutral as well as in acid or alkaline treating baths employed in textile treatment.

The solubility of 4-methyl-7-dimethylaminocoumarin in a 50% solution of the same naphthalene sulfonic acid-formaldehyde condensation product amounts, at 60°, to at most 4.5% of the solid substance.

By grinding 1 part of the preparation containing 15% of 4-methyl-7-diethylaminocoumarin with 74 parts of an oleyl sulfate containing about 60% of active substance, a textile washing agent of very good water-solubility, containing 0.2% of 4-methyl-7-diethylaminocoumarin, is obtained. By using 14 parts of the oleyl sulfate, a product which contains 1% of 4-methyl-7-diethylaminocoumarin is obtained.

Example 6

The procedure according to Example 5, paragraph 1, is followed except that the condensation product therein employed is replaced by 85 parts of a mixture of the said condensation product with technical oleyl sulfate in a proportion of 1:1. The product has a solubility similar to that of the product obtained according to Example 5. It may, in like manner, be added to synthetic washing agents.

Example 7

1 part of 4-methyl-7-diethylaminocoumarin is melted together, at 60–65° while stirring gently, with 9 parts of a polyethyleneglycol having a molecular weight of 6000–7500 and a melting point of 60–63°. There is obtained in a short time a clear, brownish, blue fluorescing melt. The cooled crystalline fusion product contains 10% of 4-methyl-7-diethylaminocoumarin. It is admixed with an 85% technical pulverulent oleyl sulfate up to a content of 0.04–1% of 4-methyl-7-diethylaminocoumarin. 2–5 grams of this washing agent dissolve without residue in cold water.

Example 8

10 parts of 4-methyl-7-diethylaminocoumarin are stirred at 60° into 90 parts of dodecylheptaglycol ether. The aminocoumarin dissolves immediately. The resultant light-brown, blue fluorescing solution contains 10% of the brightener. The preparation is miscible with cold water in all proportions. Since the 4-methyl-7-diethylaminocoumarin has unlimited solubility at 60–70° in dodecylheptaglycol ether, it is also possible to prepare a solution up to 95% strength at this temperature and then subsequently to dilute it to the desired concentration.

In contrast to 4-methyl-7-diethylaminocoumarin which is miscible in all proportions with the aforementioned polyglycol ether at 60°, the 4-methyl-7-dimethylaminocoumarin dissolves at this temperature only up to about 4.5%.

1 part of the preparation containing 10% of 4-methyl-7-diethylaminocoumarin is stirred into 74–210 parts of a 35% aqueous paste of lauryl sulfate. A washing agent is obtained which yields clear solutions at concentrations of use, from which the brightener does not separate out. The 10% preparation can also be used as such for optical bleaching purposes.

The dodecylheptaglycol ether can, with like success, be replaced by the isooctylphenyldecaglycol ether, by the oleyldodecaglycolether or by the tert. tetradecylmercaptoundecaglycolether ($C_{14}H_{29}S(C_2H_4O)_{11}H$).

Example 9

15 parts of 4-methyl-7-diethylaminocoumarin are incorporated into a melt of 85 parts of the sodium salt of oleyldecaglycoloxyacetic acid at 60–65°. In the course of a few minutes, the aminocoumarin has completely dissolved. The light-brown, blue-fluorescent, practically neutral-reacting paste contains 15% of 4-methyl-7-diethylaminocoumarin. It dissolves clearly and completely in cold water. It may be used for the preparation of neutral stock solutions up to about 300 grams per liter of preparation, containing about 45 grams per liter of 4-methyl-7-diethylaminocoumarin.

A washing agent composition, prepared by stirring together 1 part of this preparation with 74 parts of a 35% aqueous paste of lauryl sulfate, dissolves easily and completely in cold water.

*Example 10*

3 parts of 4-methyl-7-diethylaminocoumarin are stirred at 60° into a mixture of 32 parts of the sodium salt of sulfosuccinic acid dioctyl ester and 8 parts of butylglycol. There is obtained, in a few minutes, a light-brown, blue-fluorescing solution which contains 7% of the aminocoumarin and which has a good solubility even in cold water.

*Example 11*

If, in Example 8, the 10 parts of 4-methyl-7-diethyl-aminocoumarin are replaced by 12 parts of the formate of this amine, the resultant product has properties similar to those of the product of Example 8. With like success, the acetate or the ethanesulfonate of 4-methyl-7-diethyl-aminocoumarin can be used instead of the formate.

*Example 12*

6.5 parts of 4-methyl-7-diethylaminocoumarin are stirred at about 60° into 57 parts of an acid paste consisting of about 85% sodium dodecylbenzenesulfonate and about 15% of sulfuric acid of 74% strength. The resultant melt is neutralized with 82.5 parts of aqueous caustic soda of 10% strength and there is obtained, after removal of the water under reduced pressure, a solid readily water-soluble product which contains about 20% of a mixture of the dodecylbenzenesulfonic acid and sulfuric acid salt of 4-methyl-7-diethylaminocoumarin.

By mixing one part of this preparation with 19 parts of an approximately 45% technical sodium dodecylbenzenesulfonate, a washing agent is obtained which is completely soluble.

Where there is question of oleyl- and lauryl sulfate in the examples the corresponding sodium or potassium salts are to be understood.

It is evident that a large number of other surface active agents than those mentioned in the preceding examples may be chosen, especially such of the anionic type. The liquid ones are preferred if the composition should be liquid and the solid ones if the composition should be in powder form. Other anionic surface active agents than that cited in the preceding examples which may be used with essentially equal success, are sulfonated oils, such as castor oil or mineral oil, sulfonated ethers of the formula $C_8H_{17}C_6H_4O \cdot CH_2CH_2O \cdot CH_2CH_2SO_3Na$ and $C_8H_{17}C_6H_4O \cdot CH_2CH_2O \cdot CH_2CH_2O \cdot SO_3Na$, sulfonated secondary alcohols with 12 to 14 carbon atoms, alkylsulfonates with 12 to 14 carbon atoms, other fatty acid condensation products than oleoyl methyl tauride etc.

Having thus disclosed the invention, what is claimed is:

1. An easily water-soluble brightening composition which consists essentially of a two-component active ingredient constituted by a surface active agent selected from the group consisting of anionic and non-ionic detergents, and by a member selected from the group consisting of 4-methyl-7-diethylaminocoumarin and salts thereof with acids, incorporated in said surface active agent, said member constituting more than 5% by weight, calculated as free 4-methyl-7-diethylaminocoumarin, of said active ingredient.

2. An easily water-soluble brightening composition which consists essentially of a two-component active ingredient constituted by a liquid surface active polyglycol ether and by 4-methyl-7-diethyl-aminocoumarin incorporated in said liquid surface active agent, said 4-methyl-7-diethylaminocoumarin constituting more than 5% by weight of said active ingredient.

3. An easily water-soluble brightening composition which consists essentially of a two-componet active ingredient constituted by an anionic surface active agent and by 4-methyl-7-diethylaminocoumarin incorporated in said anionic surface active agent, said 4-methyl-7-diethylaminocoumarin constituting more than 5% by weight of said active ingredient.

4. A concentrate, adapted to constitute the active ingredient of an easily water-soluble brightening composition, said concentrate consisting of a surface active agent selected from the group consisting of anionic and non-ionic detergents, and of a member selected from the group consisting of 4-methyl-7-diethylaminocoumarin and salts thereof with acids, incorporated in said surface active agent, said member constituting more than 5% by weight, calculated as free 4-methyl-7-diethylaminocoumarin, of said active ingredient.

5. A concentrate, adapted to constitute the active ingredient of an easily water-soluble brightening composition, said concentrate consisting of a liquid surface active polyglycol ether and of 4-methyl-7-diethylaminocoumarin incorporated in said liquid surface active agent, said 4-methyl-7-diethylaminocoumarin constituting more than 5% by weight of said active ingredient.

6. A concentrate, adapted to constitute the active ingredient of an easily water-soluble brightening composition, said concentrate consisting of an anionic surface active agent and of 4-methyl-7-diethylaminocoumarin incorporated in said anionic surface active agent, said 4-methyl - 7 - diethylaminocoumarin constituting more than 5% by weight of said active ingredient.

References Cited in the file of this patent

UNITED STATES PATENTS

| | | |
|---|---|---|
| 2,610,152 | Ackermann | Sept. 9, 1952 |
| 2,673,186 | Wheelock et al. | Mar. 23, 1954 |